US008972986B2

(12) United States Patent
Palanisamy et al.

(10) Patent No.: US 8,972,986 B2
(45) Date of Patent: Mar. 3, 2015

(54) LOCALITY-AWARE RESOURCE ALLOCATION FOR CLOUD COMPUTING

(75) Inventors: Balaji Palanisamy, Atlanta, GA (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 13/481,614

(22) Filed: May 25, 2012

(65) Prior Publication Data

US 2013/0318525 A1 Nov. 28, 2013

(51) Int. Cl.
*G06F 9/455* (2006.01)
*G06F 9/46* (2006.01)

(52) U.S. Cl.
USPC .............................................. 718/1; 718/104

(58) Field of Classification Search
None
See application file for complete search history.

(56) References Cited

U.S. PATENT DOCUMENTS

| | | | |
|---|---|---|---|
| 7,650,331 B1 | 1/2010 | Dean et al. | |
| 8,239,847 B2 * | 8/2012 | Yu et al. | 717/149 |
| 8,484,649 B2 * | 7/2013 | Hildrum et al. | 718/102 |
| 8,499,222 B2 * | 7/2013 | Rowstron et al. | 714/776 |
| 8,510,538 B1 * | 8/2013 | Malewicz et al. | 712/225 |
| 8,595,732 B2 * | 11/2013 | Hildrum et al. | 718/102 |
| 2011/0047172 A1 | 2/2011 | Chen et al. | |
| 2011/0072206 A1 | 3/2011 | Ross et al. | |
| 2011/0246573 A1 | 10/2011 | Liu et al. | |
| 2011/0258246 A1 | 10/2011 | Khandekar et al. | |
| 2011/0276962 A1 * | 11/2011 | Chambers et al. | 718/1 |
| 2011/0302583 A1 * | 12/2011 | Abadi et al. | 718/102 |
| 2011/0313973 A1 * | 12/2011 | Srivas et al. | 707/634 |
| 2012/0042319 A1 * | 2/2012 | Hildrum et al. | 718/104 |
| 2013/0219068 A1 * | 8/2013 | Ballani et al. | 709/226 |
| 2013/0290953 A1 * | 10/2013 | Li et al. | 718/1 |

OTHER PUBLICATIONS

Palanisamy et al. "Purlieus: Locality-aware Resource Allocation foMapReduce in a Cloud", 2011 IEEE, pp. 1-11.*
Fang et al. "Evaluating I/O Scheduler in Virtual Machines for Mapreduce Application", 2010 IEEE, pp. 64-69.*
Dean, J., et al., "MapReduce: Simplified Data Processing on Large Clusters", OSDI'04: 6th Symposium on Operating Systems Design and Implementation, Dec. 2004, pp. 137-150, USENIX Association, San Francisco, United States.
Ananthanarayanan, G., et al., "Reining in the Outliers in Map-Reduce Clusters using Mantri", OSDI'10 Proceedings of the 9th USENIX conference on Operating systems design and implementation, 2010, pp. 1-14, USENIX Association, San Francisco, United States.
Mell, P. et al., "The NIST Definition of Cloud Computing", Special Publication, Version 15, Oct. 7, 2009, 2 pages, National Institute of Standards and Technology, Information Technology Laboratory, USA.

* cited by examiner

*Primary Examiner* — Van Nguyen
(74) *Attorney, Agent, or Firm* — Sherman IP LLP; Kenneth L. Sherman; Steven Laut (57) ABSTRACT

Computing resource allocation for map-reduce job execution comprises determining the volume of input data to the map-phase and the reduce-phase of a map-reduce job prior to execution. Based on said determination, data blocks and virtual machines (VMs) are selectively placed for locality aware map-reduce job execution on a cluster of computing nodes in a network. Selectively placing data blocks and VMs comprises integrally placing the data and the VMs at selected nodes to lower data transfer network hops for a map-phase and a shuffle-phase of the map-reduce job upon execution by the VMs.

20 Claims, 10 Drawing Sheets

LOCALITY-AWARE RESOURCE ALLOCATION FOR CLOUD COMPUTING

BACKGROUND

The present invention relates to cloud computing, and in particular to computing resource allocation in cloud computing.

In most modern enterprises analyzing large amounts of data efficiently and quickly is important. One analysis tool is a map-reduce style of program which includes a map-phase, a shuffle-phase and a reduce-phase. In one example, in the map-phase a primary node divides input data (i.e., problem or workload) into subsets and distributes the subsets to processing nodes, wherein each processing node computes an intermediate output. In the reduce-phase, the processing nodes combine the results for all the subsets to form an output representing the results (i.e., answer) to the input data. Between the map-phase and reduce-phase, in a shuffle-phase the data are shuffled (i.e., sorted and exchanged between nodes) in order to move the data to a node that reduces them. The shuffle-phase generates traffic and consumes network bandwidth. A map-reduce implementation by Google is described in U.S. Pat. No. 7,650,331. The Apache Hadoop project provides a similar map-reduce known as Hadoop.

Map-reduce as a service in cloud computing provides a usage model for enterprises, allowing enterprises to analyze large amounts of data without creating large infrastructures of their own. The cloud provider manages multiple map-reduce workloads executing concurrently. Network load is of special concern with map-reduce workloads as large amounts of traffic can be generated by map-reduce phases.

BRIEF SUMMARY

Embodiments of the present invention relate to computing resource allocation in cloud computing. In one embodiment, computing resource allocation for map-reduce job execution comprises determining the volume of input data to the map-phase and the reduce-phase of a map-reduce job prior to execution. Based on said determination, data blocks and virtual machines (VMs) are selectively placed for locality aware map-reduce job execution on a cluster of computing nodes in a network. Selectively placing data blocks and VMs comprises integrally placing the data and the VMs at selected nodes to lower data transfer network hops for the map-phase and the shuffle-phase of the map-reduce job upon execution by the VMs.

In another embodiment, the invention provides a computer program product for computing resource allocation for map-reduce job execution. The computer program product comprises a tangible storage medium readable by a computer system and storing instructions for execution by the computer system for performing a computing resource allocation for map-reduce job execution as above.

In another embodiment, the invention provides a system for computing resource allocation for map-reduce job execution. The system comprises a resource allocation module that is configured to selectively place data blocks and virtual machines (VMs) for locality aware map-reduce job execution on a cluster of computing nodes in a network. The resource allocation module utilizes job-specific placement of data blocks and VMs for locality awareness, wherein the placement is determined by the volume of input to the map-phase and reduce-phase of the job.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments, as well as operation and/or component parts thereof. While the following description will be described in terms of said embodiments and processes for clarity and placing the invention in context, it should be kept in mind that the teachings herein may have broad application to all types of systems, devices and applications.

Embodiments of the present invention relate to computing resource allocation in network computing. One embodiment of the invention provides map-reduce resource allocation for enhancing the performance of map-reduce jobs. One implementation of the invention provides locality-aware resource allocation for map-reduce jobs (or workloads) in a cloud computing environment.

Figure 1A:
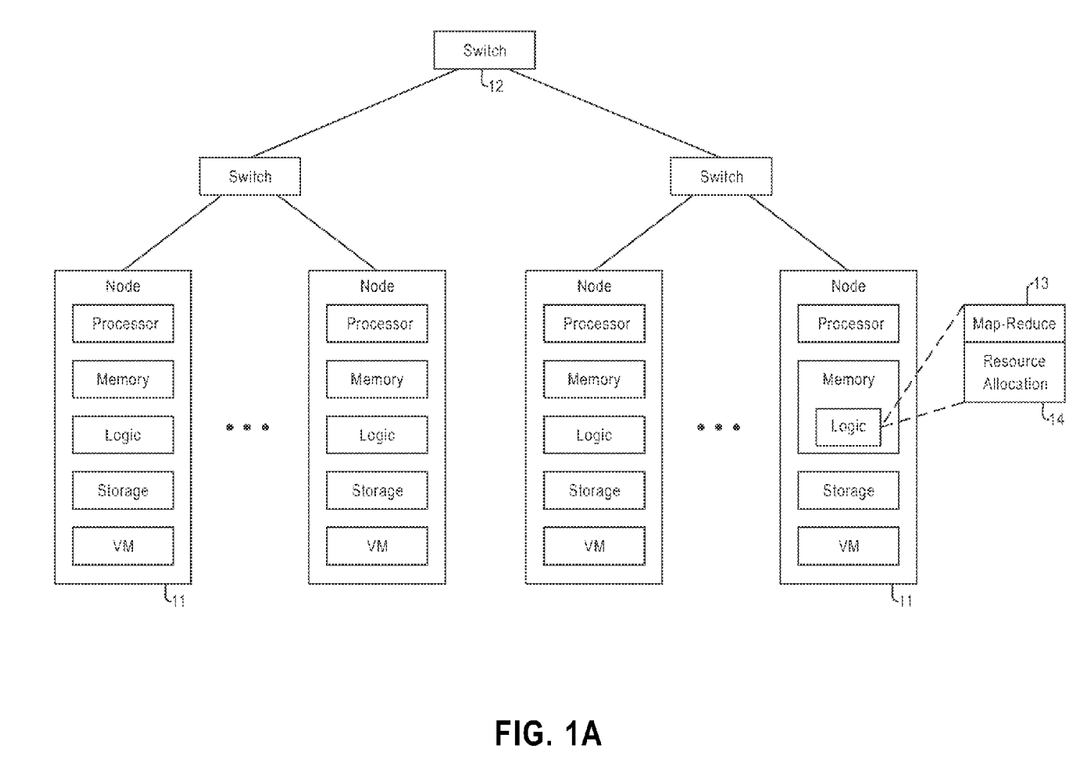
FIG. 1A shows a block diagram of an information technology system including a computing cluster having a locality-aware resource allocation system for map-reduce applications, according to an embodiment of the invention.

FIG. 1A shows an architecture of a computing network cluster 10 including computing nodes 11 in a rack interconnected via network switches 12. The cluster 10 includes a map-reduce program 13 and a resource allocation system 14, according to an embodiment of the invention. The computing nodes 11 support data storage and virtual machines (VMs) for map-reduce computation. Using VMs and storage hosted by the cloud, enterprises can create virtual map-reduce clusters to analyze their data.

Figure 1B:
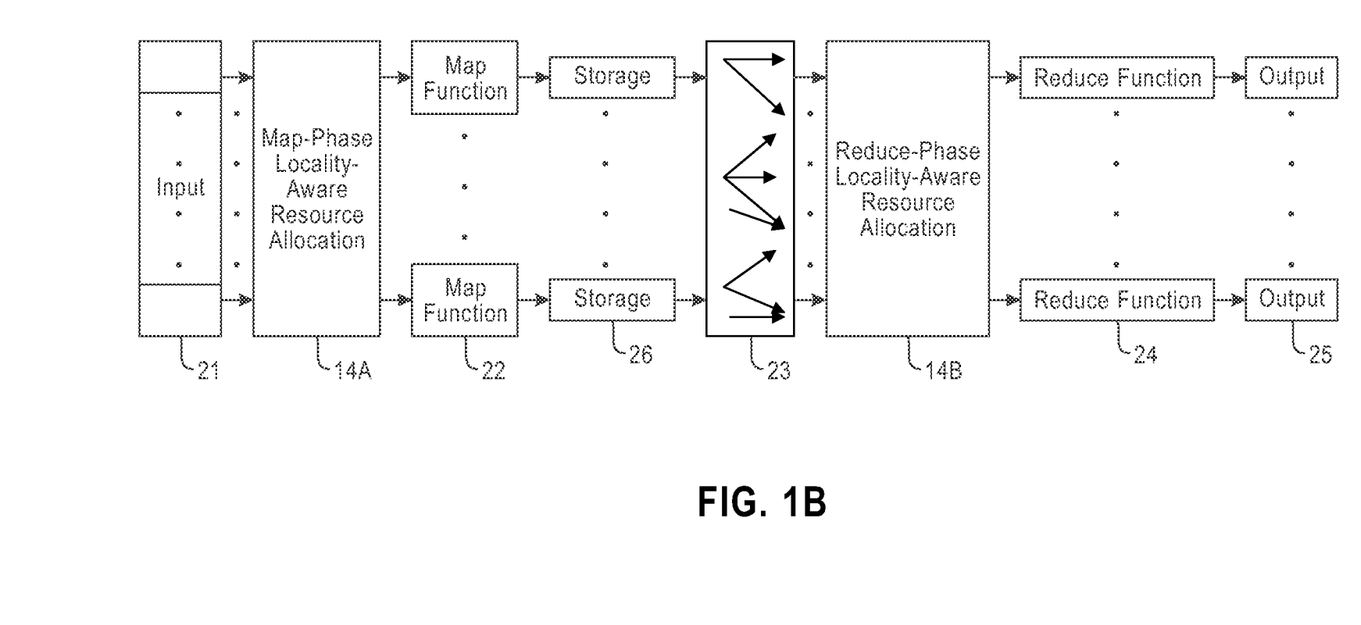
FIG. 1B shows a schematic of a map-reduce computation utilizing locality-aware computing resource allocation according to an embodiment of the invention.

FIG. 1B shows a simplified schematic of a map-reduce computation 20 for a map-reduce job, utilizing computing resource allocation according to an embodiment of the invention. Input 21 is divided into subsets and mapped via map functions 22 in a map-phase which generates output units, each with a key. The output units from the map functions 22 are passed to a shuffle module 23 in a shuffle-phase which rearranges the units such that all values with the same key are grouped together. Reduce functions 24 receive a key and a list of values in a reduce-phase, and generate more records which are stored in output files 25.

The resource allocation system 14 provisions virtual map-reduce clusters in a locality-aware manner, providing map-reduce VMs on nodes 11 access to input data and intermediate data from local or close-by physical nodes (computing machines) 11. Using locality-awareness, the resource allocation system 14 lowers the network distance between storage nodes 26 and compute nodes 22, 24 for both map-phase and reduce-phase processing.

The resource allocation system 14 includes a map-phase locality aware resource allocation function 14A and reduce-phase locality aware resource allocation function 14B, for the map-reduce computation. Locality-awareness in the map-phase resource allocation function 14A and in the reduce-phase resource allocation function 14B, improves runtime performance of map-reduce jobs, and reduces network traffic generated in a cloud data center.

In one embodiment of the invention, for the map-phase, the map-phase resource allocation function 14A selects VMs on nodes 11 for executing the map-phase tasks 22, wherein the nodes providing VMs are close in distance to the nodes 11 that store the input data (preferably local to those nodes). For the reduce-phase, the map-phase resource allocation function 14B selects the VMs on nodes 11 for executing reduce-phase tasks 24 to be close in distance to the map-phase VMs which generate the intermediate data used by the reduce-phase. In one example, a closeness (i.e., distance) measure between two nodes comprises the number of network hops therebetween.

Improving data locality using the resource allocation system 14 reduces overall job execution times by lowering network data transfer times. Further, improved data locality reduces cumulative data center network traffic. In one embodiment of the invention, improved data locality is accomplished by the coupling of otherwise independent, data store and VM placement processes for map-phase tasks and reduce-phase tasks as described further below.

Embodiments of the invention further provide a map-reduce cloud resource allocation system that improves data locality during both map-phase and reduce-phase of the map-reduce job by selectively coupling data and computation (VM) placement in the cloud. In one embodiment, the resource allocation system 14 categorizes map-reduce jobs based on how much data they access during the map-phase and reduce-phase, and analyzes the network flows between sets of nodes 11 (computing machines) that store the input/intermediate data and those nodes 11 that process the data (i.e., VMs for map-phase tasks and reduce-phase tasks).

The resource allocation system 14 places data in storage on those nodes that can either be used to process the map-reduce data themselves, or are close to the nodes that can perform the map-reduce processing. This is in contrast to conventional map-reduce schemes which place data on nodes independent of map-phase and reduce-phase computational placement on nodes (for example, conventional data are placed on any node in the cluster which has sufficient storage capacity).

Figure 2:
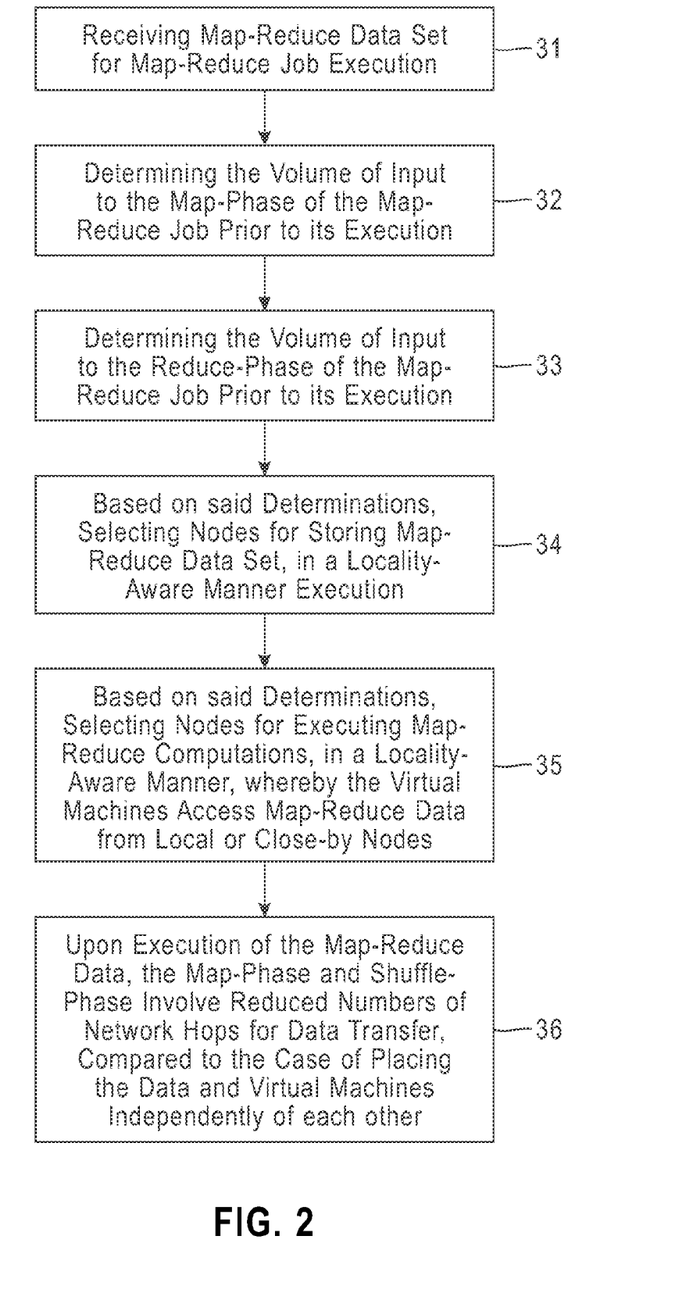
FIG. 2 shows a flowchart of a resource allocation process for a map-reduce application, according to an embodiment of the invention.

FIG. 2 shows a flowchart of a resource allocation process 30, according to an embodiment of the invention. The resource allocation process provides integrated placement of data blocks and virtual machines (VMs) for locality aware map-reduce job execution.

Process block 31 comprises receiving map-reduce data set for map-reduce job execution. Process block 32 comprises determining the amount (volume) of input to the map-phase of the map-reduce job prior to its execution. Process block 33 comprises determining the amount of input to the reduce-phase of the map-reduce job prior to its execution. Process block 34 comprises, based on said determinations, selecting nodes for map-reduce data set in a locality-aware manner.

Process block 35 comprises, based on said determinations, selecting nodes for virtual machines to execute map-reduce computations (i.e., map-phase and reduce-phase tasks), in a locality-aware manner. Said virtual machines access map-reduce data (i.e., input data and intermediate data) from local or close-by nodes. According to process block 36, upon execution of the map-reduce data, the map-phase and shuffle-phase involve reduced numbers of network hops for data transfer, compared to the case of placing the data and virtual machines independently of each other.

In one embodiment, said resource allocation results in at least 50% reduction in job execution time, compared to the case of placing the data blocks and virtual machines independently of each other.

In one embodiment, said resource allocation comprises job-specific placement of data blocks and virtual machines for locality awareness, wherein the placement is determined by the volume of input to the map-phase and reduce-phase of the job.

System Model

In one example, users using a map-reduce cloud service load their input datasets and map-reduce jobs into the service. This is similar to any typical cloud service which requires setting up the application stack and data. There is one key distinction, however. Typically cloud service providers use two distinct infrastructures for storage and computation. Executing a map-reduce job in such infrastructures requires an additional loading step, in which data are loaded from the storage cloud into the distributed file system of the map-reduce VMs running in the compute cloud, before the job begins execution.

Such additional loading has two drawbacks. First, depending on the amount of data required to be loaded and connectivity between the computation and storage infrastructures, said loading adversely impacts performance. Second, while the job is running (often for long durations), the dataset is duplicated in the cloud (along with the storage cloud original, there is a copy in the compute cloud for map-reduce processing), leading to higher resource use for the provider.

According to an embodiment of the invention, the resource allocation system 14 stores data (i.e., map-reduce data) in a dedicated map-reduce cloud, and map-reduce jobs (i.e., map-phase and reduce-phase) execute on the same nodes that store the data, without waiting to load data from a remote storage cloud. The resource allocation system 14 improves data locality for map-reduce in a cloud by coupling data placement with VM placement for map-reduce computation, to provide both map-phase and reduce-phase locality. This locality reduces network traffic which would otherwise be required for map-phase and reduce-phase tasks to access such data. The map-phase and shuffle-phase involve reduced numbers of network hops for data transfer, compared to the case of placing the data blocks and virtual machines independently of each other.

According to an embodiment of the invention, the resource allocation system 14 uses a dedicated map-reduce service in which data are directly stored on the same nodes that run map-reduce VMs (i.e., map-phase and reduce-phase computations). This prevents the need for a data loading step before executing a map-reduce job. Because map-reduce input data are often predominantly used for map-reduce analysis, storing the input data into a dedicated cloud service provides the greatest opportunity for optimization.

In one embodiment, the resource allocation system 14 enables transition of data stored on nodes to the map-reduce VMs in a seamless manner (i.e., without requiring an explicit data loading step). When users upload their data into the dedicated map-reduce service, the data are broken up into chunks corresponding to map-reduce blocks and stored on a distributed file system of the nodes. According to embodiments of the invention, the placement of data (i.e., deciding which nodes to use for each dataset) is performed intelligently (i.e., selectively) as described further below.

According to an embodiment of the invention, when the map-reduce job begins executing (i.e., map-reduce VMs are initialized) the data on nodes is seamlessly made available to VMs using two processes. In a first process (loop-back mount), when data for a job is loaded into the cloud, the chunks being placed on each node are stored via a loop-back mount into a single data file (referred to as vdisk-file). This provides access similar to any local file system, even though all data are being stored in a single file on the hypervisor's file system. In a second process (VM disk-attach), the vdisk-file is then attached to the VM as a block device using server virtualization tools (e.g., KVM's virsh attach-device command). The VM can then mount the vdisk-file as it would any typical file system. The mount point of the vdisk-file inside the VM serves as the map-reduce DFS directory (e.g., Hadoop's data.dirconfiguration variable). Table 1 below shows an example resource allocation process for storing data persistently on a node and seamlessly transferring it to one of its VMs without requiring additional loading, according to an embodiment of the invention.

TABLE 1

Data storage and transfer process

1. Create a vdisk file on the hypervisor (for instance, 5 GB)
dd of = vdisk-file bs = 1M count = 0 seek = 5192
2. Format as ext2:
mkfs.ext2 -F vdisk-file
3. Loopback mount the vdisk file:
mount -t ext2 -o loop vdisk-file vdisk-mount
4. Store input data into vdisk-mount in a map-reduce chunk format e.g. as a simplification, by creating a map-reduce cluster on the nodes.
5. Unmount vdisk-mount. vdisk-file represents persistent data for each VM.
6. Upon VM initialization, the vdisk file is attached to the VM as a block device
virsh attach-device vm vdisk-file-cfg.xml
7. VM can mount the block device like a new disk
mount -t ext2 /dev/sdb /data-dir
/data-dir contains dataset blocks and used as Hadoop dfs.data.dir
8. Virtual map-reduce cluster is initialized between the VMs by starting the map-reduce cluster - each VM reports the data blocks to the map-reduce NameNode to initialize the filesystem. Then job execution can begin.
9. After job execution, VMs can be destroyed. On subsequent initializations, only steps 6 onwards need to be performed.

The data storage and transfer process ensures that data are loaded onto the same nodes that host the VMs for map-reduce computation. This is the case even while the VMs are non-persistent (e.g., user may cease VMs between different job executions to minimize resource use), and the data are persistently stored on the nodes. By using the VM disk-attach step, the process seamlessly transitions the data into the VM cluster without requiring explicit loading. In contrast, a separate compute and storage cloud infrastructure would require the data loading overhead each time the VMs are initialized.

According to an embodiment of the invention, if a map-reduce VM is required to be placed on a node other than the node containing that job's data chunks, the vdisk file can be copied over to the appropriate node and then attached to the VM.

As such, according to an embodiment of the invention, a resource allocation process addresses data placement and VM placement based on locality information. Specifically, data placement entails selecting nodes for each dataset (data blocks). VM placement entails selecting where the VMs should be provisioned to process the data blocks. Poor placement of data or VMs may result in poor performance. The resource allocation process addresses data placement and VM placement with a coupled placement strategy, wherein data placement takes into consideration likely VM placement in order to improve locality.

Job Specific Locality-Awareness

According to an embodiment of the invention, selection of nodes for data placement take into account attributes such as the type of job processing and/or the loads on the servers, in a multi-tenant virtualized cloud environment, as detailed below.

According to an embodiment of the invention, a resource allocation process places data in the map-reduce cloud service by incorporating and taking into account job characteristics including the amount of data accessed in the map-phase and reduce-phase. For example, a job that processes a large amount of reduce-phase data (referred to as a reduce-input heavy job), is best served by provisioning the VMs of a map-reduce cluster close to each other on the cluster network, as each reducer reads the outputs of all mappers. If the VMs are far from each other, each reducer will read map-phase outputs over longer network paths, which increases job execution time and also increases cross-rack traffic in the data center. On the other hand, map-input heavy jobs that generate little intermediate data do not benefit by placing their data blocks close to each other on the cluster. According to an embodiment of the invention, an efficient data placement scheme distributes data blocks for such a map-input heavy job across the network to preserve resources for placing reduce-input heavy jobs on closely connected machines.

In one embodiment of the resource allocation process, three distinct types/classes of jobs are taken into account as follows: (1) Map-input heavy, (2) Map-and-Reduce-input heavy, and (3) Reduce-input-heavy. An example of a Map-input heavy job comprises a large grep workload that generates small intermediate data simply indicating if a word occurs in input data. An example of a Map-and-Reduce-input heavy job comprises a sort workload wherein intermediate data are equal to input data. An example of a Reduce-input-heavy job comprises a permutation generator workload which generates permutations of input strings. In one embodiment, the resource allocation process uses different data placement strategies for different job types with the goal of improving data locality.

Load Awareness

According to an embodiment of the resource allocation process, placing data in a map-reduce cloud accounts for computational load (e.g., CPU, memory) on the nodes. The resource allocation process places data for a map-reduce job on nodes that are likely to have available capacity to execute that job, else remote-reads will be required to pull data from busy machines to be processed at less-utilized machines.

Figure 3A:
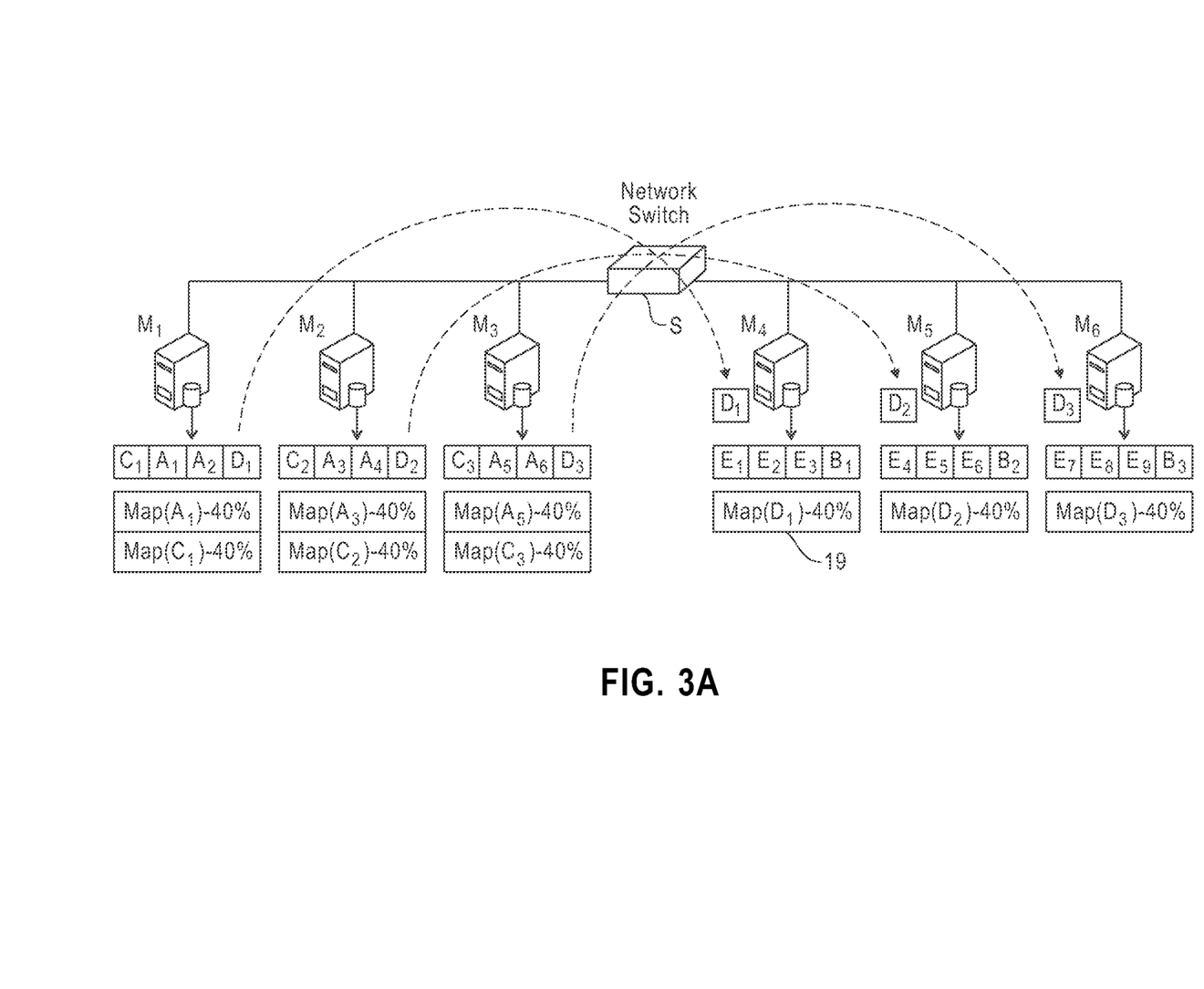
FIG. 3A shows an example of conventional resource allocation for a map-reduce application in a computing cluster.

For example, FIG. 3A shows a cluster of nodes (e.g., $M_1$ to $M_6$) and datasets A, B, C, D and E placed on the six nodes $M_1$ to $M_6$. A load unaware placement process may co-locate the blocks of datasets A, C and D together, even if map-reduce jobs execute on (i.e., access) datasets A, C, D more frequently and generate higher loads than datasets B and E. When the job on the dataset D arrives and requests a virtual cluster of three VMs (e.g., each VM with 40% CPU resources of the node), embodiments of the invention place the VMs on the nodes $M_1$, $M_2$ and $M_3$ because they contain the data blocks of the dataset D. However, a conventional resource allocation places the VMs on nodes $M_4$, $M_5$ and $M_6$, resulting in remote reads for the job executing on dataset D (as shown by the broken arrows in FIG. 3A), and more network traffic through the network switch S.

Figure 3B:
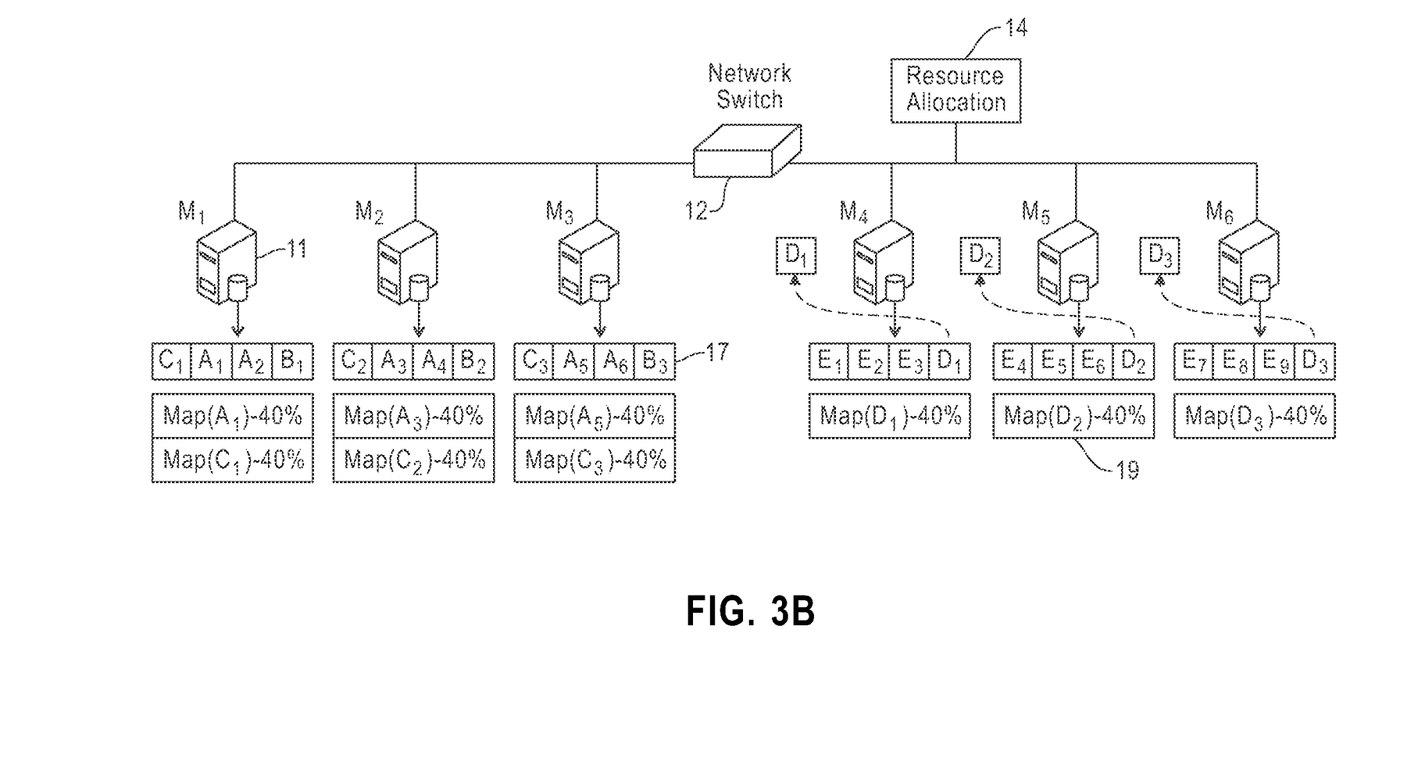
FIG. 3B shows an example of locality-aware resource allocation for a map-reduce application in a computing cluster, according to an embodiment of the invention.

By contrast, as shown in the cluster of nodes in FIG. 3B, the resource allocation system 14 according to an embodiment of the invention provides load-aware data placement. The allocation system achieves local execution for all the map-phase tasks because it is able to host the VMs on the nodes 11 (e.g., nodes $M_1$ to $M_6$) containing the input data blocks. Specifically, the locality-aware resource allocation system 14 places blocks of datasets A, B, C on nodes $M_1$, $M_2$ and $M_3$, and places blocks of datasets E and D on nodes $M_4$, $M_5$ and $M_6$ as shown in FIG. 3B. The resource allocation system 14 further places the VMs on the nodes $M_1$, $M_2$ and $M_3$ as they contain the data blocks of the dataset D, resulting in local reads for the job executing on dataset D (as shown by the broken arrows in FIG. 3B), and lowering network traffic through the network switch 12. In FIGS. 3A-3B, each Map(d) function 19 represents a map-reduce task (e.g., functions 22, 24 in FIG. 1B) on a dataset block 17 (e.g., a data block d such as $A_1$, $C_2$, $A_5$, ... ).

While placing data blocks, the resource allocation system 14 ensures that the expected load on the nodes (e.g., servers) does not exceed a configurable threshold. This incorporates the frequency and load generated by jobs executing on datasets stored on the nodes. Information about expected loads on each dataset is available to a cloud provider by monitoring the cloud environment. The cloud provider also has sufficient data to estimate job arrival rate and the mean execution time.

Job-Specific Data Replication

Traditionally, data blocks in map-reduce processing are replicated within a node cluster for resiliency. While the job is executing, any replica of a data block can be used for processing. According to an embodiment of the invention, the resource allocation process handles replication in a different manner. Depending upon the type and frequency of jobs, each replica of the entire dataset is placed based on a particular strategy. For example, if an input dataset is used by three sets of map-reduce jobs, two of which are reduce-input heavy and one map-input heavy, the resource allocation process places two replicas of data blocks via a reduce-input heavy strategy and the third one using map-input heavy strategy. This allows maintaining greater data locality, especially during the reduce-phase. Otherwise, by processing data block replicas far from other input data blocks during the map-phase, the reducers may be forced to read more data over the network.

Placement Techniques

In the following description, examples of data and VM placement for various classes of map-reduce jobs according to embodiments of the invention, are provided. In one example, the goal of the placements is to minimize the total resource used by reducing a dist( ) function for map-phase and/or reduce-phase, wherein in one example the dist( ) function denotes a distance measure between two nodes as the number of network hops therebetween.

Map-Input Heavy Jobs

Map-input heavy jobs read large amounts of input data for map-phase but generate only small map-outputs that is input to the reduce-phase. According to an embodiment of the invention, for placement, map-phase nodes (i.e., mappers) of such jobs are placed close to input data blocks so that they can read data locally, while reduce-phase nodes (i.e., reduces) are scheduled farther since amount of map-output data are small.

Placing Map-Input Heavy Data

As map-input heavy jobs do not require reducers to be executed close to each other, according to an embodiment of the invention the VMs of the map-reduce cluster are placed anywhere in the data center. Thus, nodes to place the data are selected only based on the storage utilization and the expected load, $E_k$, on the machines. In a cost model, $E_k$ denotes the expected load on a node $M_k$, wherein in this case k is the node (server) index, $M_k$ denotes the node (server), $E^k$ denotes the expected load on node $M_k$:

$$E^k = \sum_i W_i^k \times CRes(D_i)$$

where $W_i^k$ is the expected number of jobs on a dataset $D_i$ running on the node $M_k$, and CRes ($D_i$) denotes the cost (i.e., computational resources required) for each VM of the job on $D_i$, given the type of VM chosen by the user. To store map-input heavy data chunks, according to an embodiment of the invention the resource allocation process selects machines that have the least expected load. This ensures that when map-reduce VMs are placed, there is likely to be capacity available on machines storing the input data.

VM Placement for Map-Input Heavy Jobs

According to an embodiment of the invention, VM placement by the resource allocation process attempts to place VMs on the nodes that contain the input data chunks for the map-phase. This results in lower MCost (i.e., the dominant component for map-input heavy jobs). Here MCost captures the network traffic based on the amount of data that need to be transferred during the map phase. Because data placement places data blocks on machines that have lower expected computational load, it is less likely that at the time of job execution some machine containing the data chunks does not have the available capacity. For such a case, the VM may be placed close to the node that stores the actual data chunk. Specifically, the VM placement iteratively searches for a node having sufficient resources in increasing order of network distance from the node storing the input data chunk. Among the nodes at a given network distance, the one having the least load is selected.

Map-and-Reduce-Input Heavy Jobs

Map-and-reduce-input heavy jobs process large amounts of input data and also generate large intermediate data. According to an embodiment of the invention, the resource allocation process optimizes cost for such jobs by reducing the dist( ) function during both their map-phase and reduce-phase.

Placing Map-and-Reduce-Input Heavy Data

According to an embodiment of the invention, to achieve high map-locality, data are placed on nodes that can host VMs locally. This data placement supports reduce-locality for which the VMs are hosted on machines close to each other (e.g., within a rack of servers), such that reduce-phase traffic does not significantly load the data center network. An example VM placement topology is a subgraph structure that is densely connected (similar to a clique) wherein every node is connected to every other node in 1-hop.

In some cases it may not be possible to find cliques of a given size. This is because the physical network may not have a clique or even if it does, some of the machines may not have sufficient resources to hold the data or their expected computational load may be sufficiently high to not allow VM placement later. According to an embodiment of the invention, an alternate VM placement involves finding subgraph structures similar to cliques. A number of clique relaxations may be used, one of which is k-club. A k-club of a graph G is defined as a maximal subgraph of G of diameter k. While finding k-club is NP-Complete for a general graph, data center networks are typically hierarchical (e.g., fat-tree topologies) and this allows finding a k-club in polynomial time. In a data center tree topology, the leaf nodes represent the nodes and the non-leaf nodes represent the network switches. To find a k-club containing n leaf nodes, the process simply finds the subtree of height k/2 containing n or more leaf nodes.

According to an embodiment of the invention, for map-and-reduce-input heavy jobs, data blocks are placed in a set of closely connected nodes that form a k-club of least possible k (i.e., least possible height of the subtree) given the available storage resources in them. If several subtrees exist with the same height, then the one having the maximum available resource is selected.

Figure 4A:
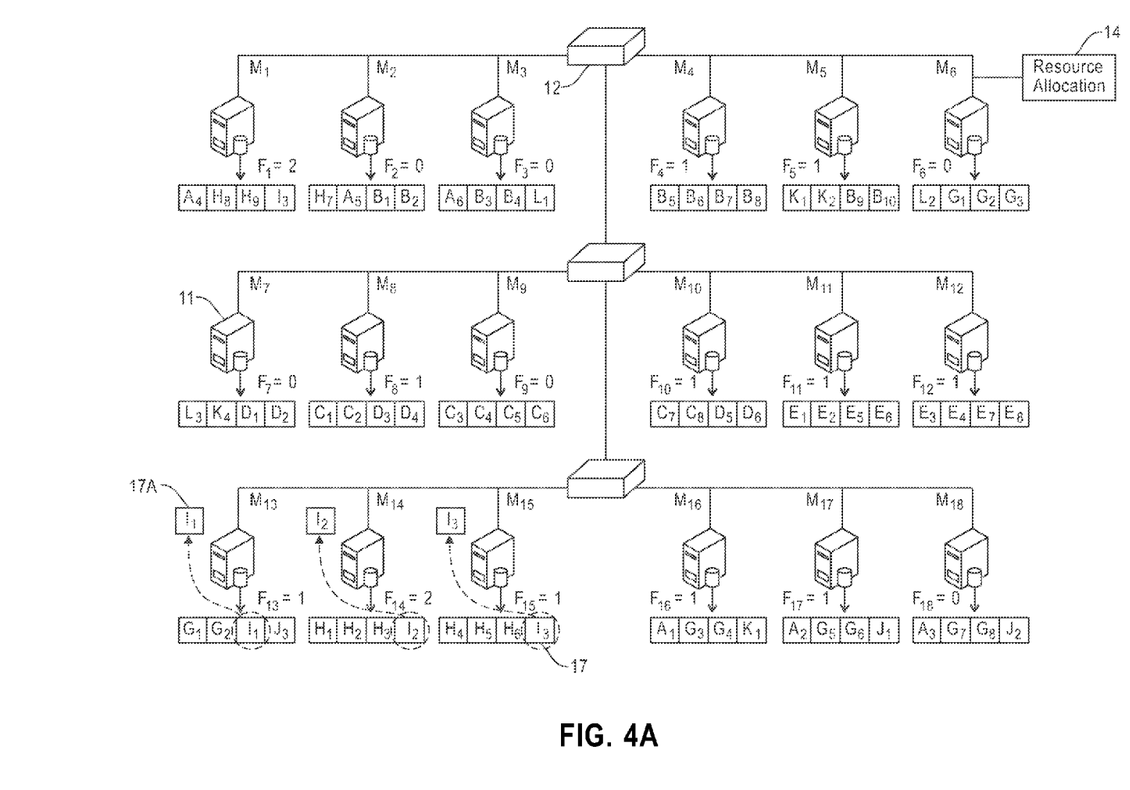
FIG. 4A shows an example of locality-aware resource allocation for a map-phase of a map-reduce application in a computing cluster, according to an embodiment of the invention.

FIG. 4A shows a cluster of nodes and illustrates map-phase data and VM placement by the resource allocation system 14, according to an embodiment of the invention. Data blocks 17 are placed on each node 11 (e.g., nods $M_1$ to $M_{18}$). Each block 17A (e.g., input data block $I_1$ for node $M_{13}$ for map-phase) indicates reading of the block for map-phase processing (e.g., function 22 in FIG. 1B). A value measure F for each node 11 denotes available computational capacity (e.g., number of VMs that can be placed on that node 11).

As an illustration, in FIG. 4A, the input data blocks $I_1$, $I_2$, and $I_3$ are stored in a closely connected set of nodes $M_{13}$, $M_{14}$ and $M_{15}$ that form a k-club of least possible k in the cluster. The broken arrows in FIG. 4A illustrate that each VM on a node M reads data blocks locally (i.e., placed on the same node as that VM), thereby lowering network traffic through the switches 12 for the map-phase.

Figure 4B:
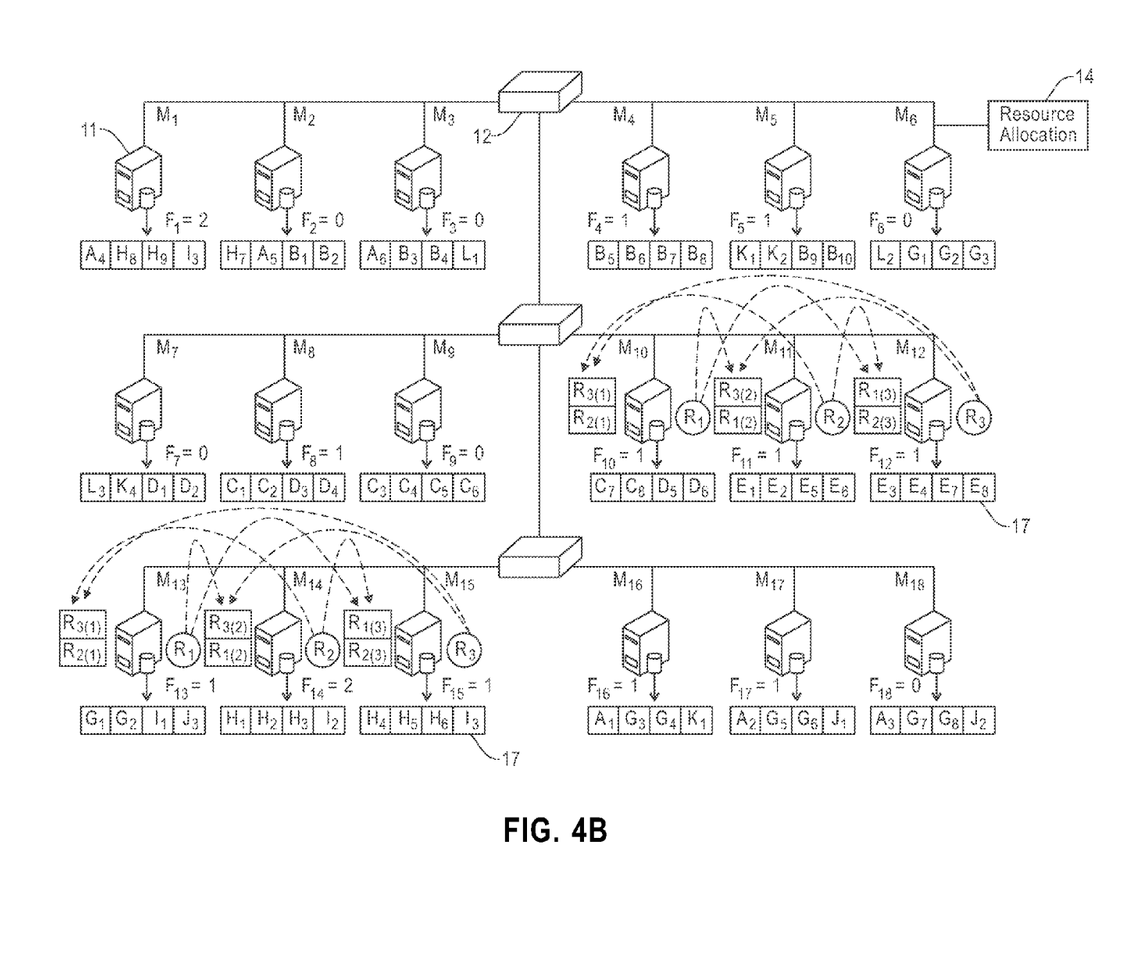
FIG. 4B shows an example of locality-aware resource allocation for a map-phase of a map-reduce application in a computing cluster, according to an embodiment of the invention.

FIG. 4B illustrates reduce-phase data and VM placement, according to an embodiment of the invention. In reduce-phase, $R_i$ indicates map-phase outputs and square $R_{i(j)}$ indicates reading of intermediate data for reducer j from map-phase task output i. The broken arrows in FIG. 4B illustrate that each VM on a node M reads data blocks without going across racks, thereby lowering network traffic for the reduce-phase.

In one embodiment of the invention, the nodes form a network tree topology comprising a k-club of least possible k, wherein a k-club of a graph G is defined as a maximal subgraph of G of diameter k. The network tree topology is processed bottom-up to find shortest subtrees (i.e., the minimum k/2) that have at least n nodes, wherein n is the number of VMs desired for the job (the nodes in that subtree will form a k-club, where k/2 is the height of the subtree). The network tree topology is processed for subtrees of the same height, wherein the tree with the most available expected resources is selected, as shown by example in FIG. 4B.

In FIGS. 4A-4B, the nodes $\{M_1, M_2, M_3, M_4, M_5, M_6\}$ form a 2-club and similarly the nodes in the sets $\{M_7, M_8, M_9, M_{10}, M_{11}, M_{12}\}$ and $\{M_{13}, M_{14}, M_{15}, M_{16}, M_{17}, M_{18}\}$ form 2-clubs respectively. Specifically, the data goes through one switch and 2-hops and there it forms a 2-club. Thus, each of the above mentioned sets forms a subtree and the network switch connected to nodes $\{M_7, M_8, M_9, M_{10}, M_{11}, M_{12}\}$, connecting the switch to the other two subtrees, thus forming the entire data center tree.

VM Placement for Map and Reduce-Input Heavy Jobs

According to an embodiment of the invention, data placement places data blocks in a set of closely connected nodes. VM placement ensures that VMs are placed either on the nodes storing the input data or the close-by nodes. This reduces the distance on the network that the reduce-phase traffic needs to travel, speeding up job execution while simultaneously reducing cumulative data center network traffic.

In the example shown in FIGS. 4A-4B, VMs for job on dataset I are placed on the nodes storing input data. As a result, map-phase tasks use local reads (FIG. 4A) and reduce-phase tasks also read within the same rack, thereby maximizing reduce-phase locality (FIG. 4B). For example, in case node $M_{15}$ did not have available resources to host the VM, then the next candidates to host the VM would be $M_{16}$, $M_{17}$ and $M_{18}$, all of which can access the input data block $I_3$ by traversing one network switch, and are close to the other reducers executing in $M_{13}$ and $M_{14}$. If any of $M_{16}$, $M_{17}$ and $M_{18}$ nodes did not have available resources to host a new VM, then the placement process iteratively proceeds to the next node rack (i.e., $M_7$, $M_8$, $M_9$, $M_{10}$, $M_{11}$ and $M_{12}$) and looks for a node to host the VM. Thus, the process attempts to maximize locality even if the nodes containing input data blocks are unavailable to host the VMs.

Reduce-Input Heavy Applications

Jobs that are reduce-input heavy read small sized map-inputs and generate large map-outputs that serve as the input to the reduce-phase. According to an embodiment of the invention, for these types of jobs, reduce-locality is favored over map-locality.

Placing Reduce-Input Heavy Data

As map-input to reduce-input heavy jobs are light, the map-locality of the data are not as important. Therefore, the map-input data are placed anywhere within the cluster as it can be easily transferred to the corresponding VMs during map-phase execution. According to an embodiment of the invention, the data placement process selects the node with maximum free storage. FIG. 4A shows an example placement of input data blocks for dataset L including $L_1$, $L_2$ and $L_3$ on $M_3$, $M_6$ and $M_7$, which are selected only based on storage availability, even though they are not closely connected.

VM Placement for Reduce-Input Heavy Jobs

Network traffic for transferring intermediate data among map-reduce VMs is intense in reduce-input heavy jobs. According to an embodiment of the invention, the set of VMs for reduce-input heavy jobs is to be placed close to each other. For example, for a job using the dataset L containing $L_1$, $L_2$ and $L_3$ in FIG. 4A, the VMs can be hosted on any set of closely connected nodes, such as $M_{10}$, $M_{11}$ and $M_{12}$. The VMs are within a single rack and form a 2-club (i.e., diameter of 2 with a single network switch). Although the map-phase requires remote reads from the nodes storing the input data, $M_3$, $M_6$ and $M_7$, job performance is not impacted much because the major chunk of data transfer occurs only during the reduce-phase. In the reduce-phase, as VMs are placed in a set of densely connected nodes, the locality of the reads is maximized, leading to faster job execution.

Said process for finding a k-club of a given size with available resources, and said process for finding a node close to another node in the physical cluster comprise computations that are efficient for typical data center hierarchical topologies. The data and VM placement process according to embodiments of the invention scale well with increasing sizes of datasets or the cloud data center.

Figure 5:
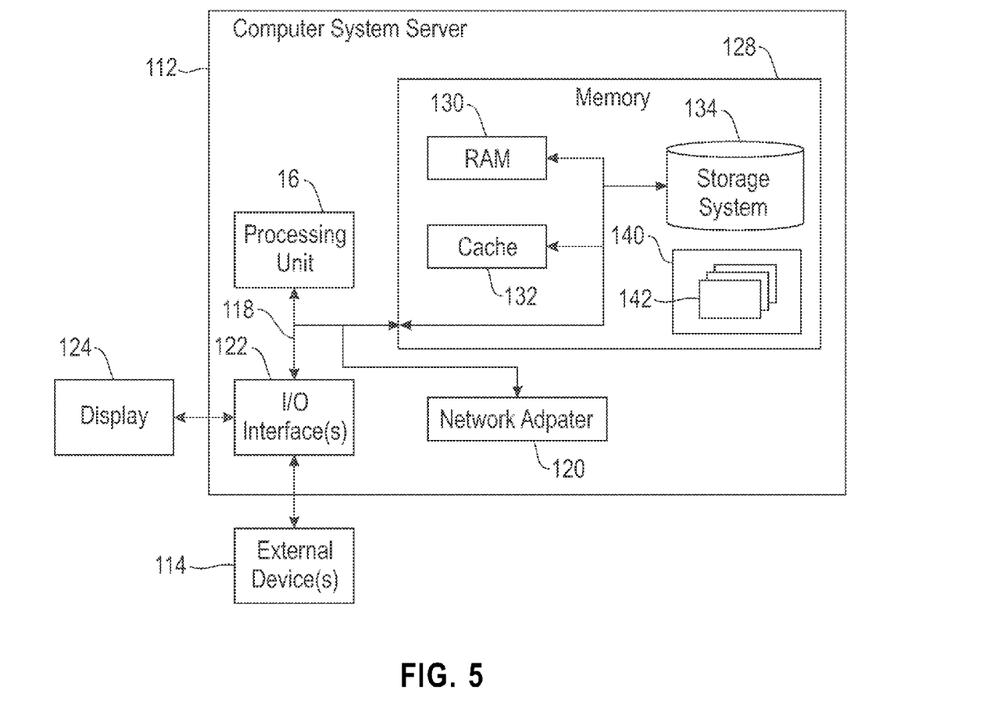
FIG. 5 depicts a cloud computing node according to an embodiment of the present invention.

FIG. 5 shows a schematic of an example cloud computing node 100 (such as node 11 in FIG. 1A), implementing an embodiment of the invention for map-reduce resource allocation in a cloud. FIG. 5 illustrates a resource allocation system architecture for a map-reduce cloud service, wherein the resource allocation system utilizes data locality for data and virtual machine placement. Such data and virtual machine placement lower job execution times and network traffic in a data center. The resource allocation system achieves high data locality by optimizing for data locality during both map-phase and reduce-phase of a job by considering VM placement, map-reduce job characteristics and load on the physical cloud infrastructure at the time of data placement.

Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 112 in cloud computing node 100 is shown in the form of a general-purpose computing device. The components of computer system/server 112 may include, but are not limited to, one or more processors or processing units 116, a system memory 128, and a bus 118 that couples various system components including system memory 128 to processor 116. Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 112 typically includes a variety of computer system readable media. Such media may be any available media that are accessible by computer system/server 112, and they include both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating systems, one or more application programs, other program modules, and program data or some combination thereof, may include an implementation of a networking environment. Program modules 142 generally carry out the functions and/or methodologies of embodiments of the invention as described herein. Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 6:
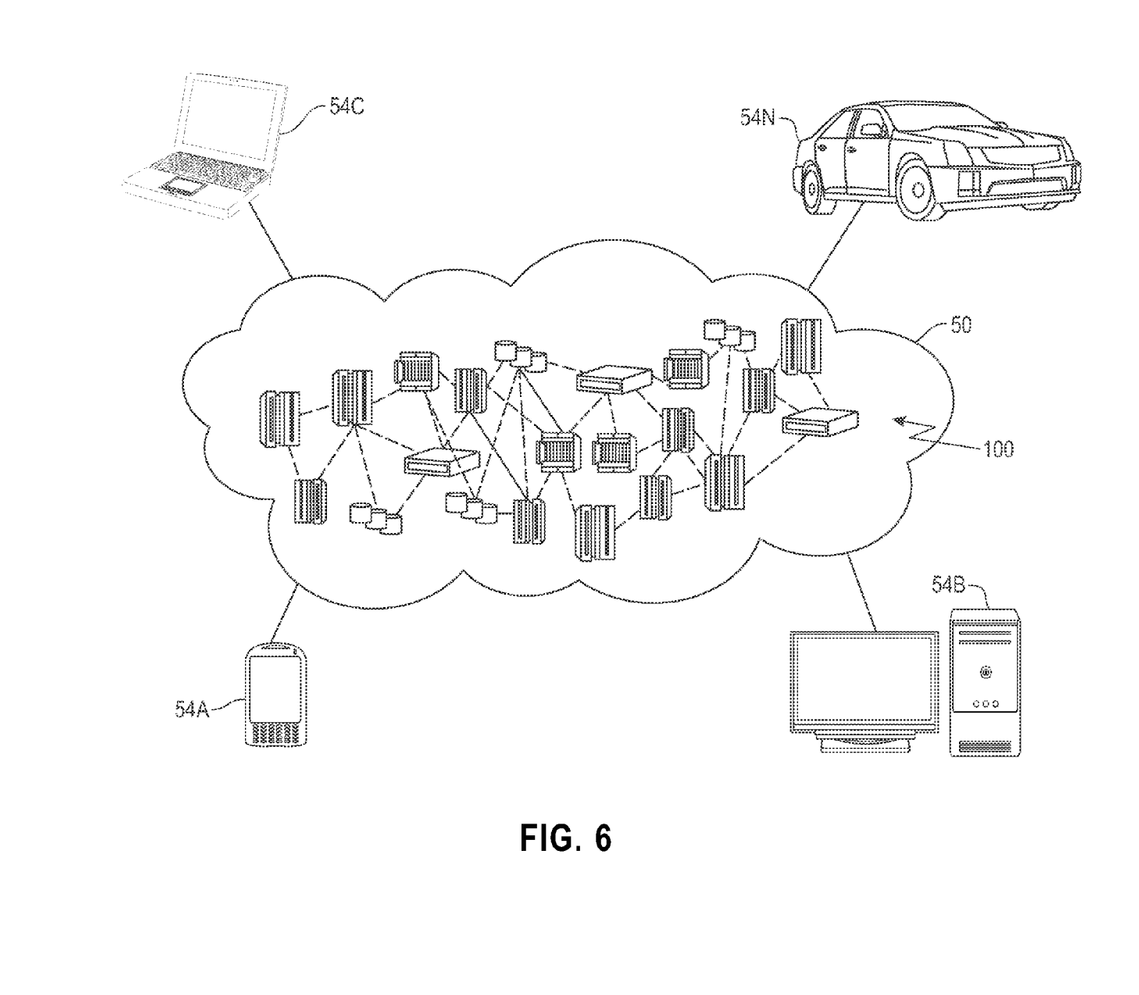
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
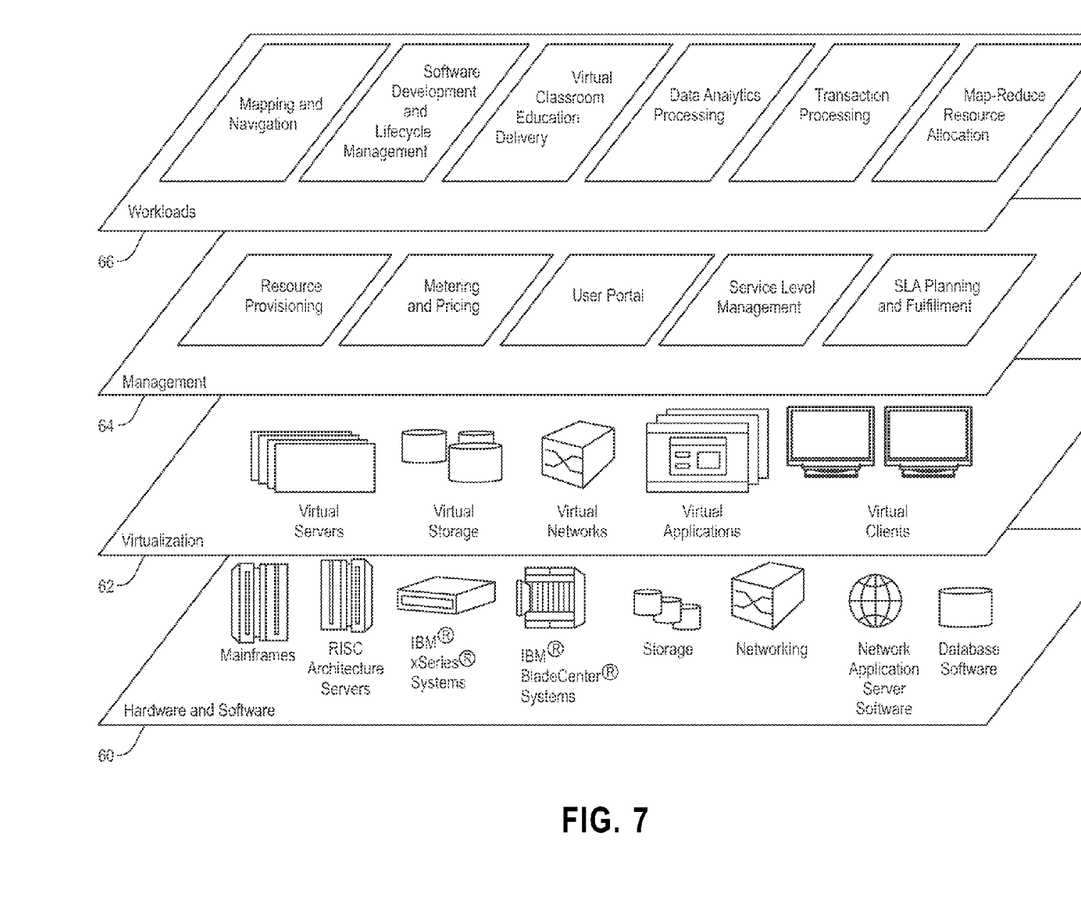
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described herein. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and map-reduce resource allocation, according to embodiments of the invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and its practical applications, and to enable others of ordinary skill in the art to understand the various embodiments, with various modifications as are suited to the particular use contemplated.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other modifications may occur to those ordinarily skilled in the art.

What is claimed is:

1. A method of computing resource allocation for map-reduce job execution, the method comprising:
   determining, using a processor, the volume of input data to the map-phase and the reduce-phase of a map-reduce job prior to execution;
   based on said determination, using the processor for selectively placing data blocks and virtual machines (VMs) for locality aware map-reduce job execution on a cluster of computing nodes in a network, wherein the network comprises a network tree topology;
   wherein selectively placing data blocks and VMs comprises:
      integrally placing the data and the VMs at selected nodes to lower data transfer network hops for a map-phase and a shuffle-phase of the map-reduce job upon execution by the VMs; and
      selectively placing data blocks and VMs by processing the network tree topology to find shortest subtrees that have a particular number of nodes.

2. The method of claim 1, wherein:
   said selectively placing comprises integrally placing the data and the VMs at selected nodes to lower data transfer network hops for a map-phase and a shuffle-phase of the map-reduce job upon execution by the VMs, compared to placing the data blocks and VMs independently of each other.

3. The method of claim 2, wherein:
   the nodes form a k-club of least possible k, wherein a k-club of a graph G is defined as a maximal subgraph of G of diameter k.

4. The method of claim 3, wherein
   selectively placing data blocks and VMs by processing the network tree topology to find shortest subtrees that have a particular number of nodes comprises processing the network tree topology bottom-up to find shortest subtrees that have at least n nodes, wherein n is the number of VMs desired for the job and for subtrees of the same height, and selecting the tree with the most available expected computing resources.

5. The method of claim 4, wherein:
   the shortest subtrees form a k-club, where k/2 is the height of the subtree.

6. The method of claim 2, wherein lowering data transfer network hops results in at least 50% reduction in job execution time, compared to the case of placing the data blocks and virtual machines independently of each other.

7. The method of claim 1, wherein said placing data blocks and virtual machines comprises integrated placement of data blocks and VMs for locality aware map-reduce job execution.

8. A method of computing resource allocation for map-reduce job execution, the method comprising:
using a processor for selectively placing data blocks and virtual machines (VMs) for locality aware map-reduce job execution on a cluster of computing nodes in a network, utilizing job-specific placement of data blocks and VMs for locality awareness, wherein the placement is determined by the volume of input to the map-phase and reduce-phase of the job, wherein the network comprises a network tree topology, and selectively placing data blocks and VMs comprises selectively placing data blocks and VMs by processing the network tree topology to find shortest subtrees that have a particular number of nodes.

9. The method of claim 8, comprising:
allocating resources based on locality awareness for a map-phase job execution by selectively placing data blocks and virtual machines (VMs) for locality aware map-phase job execution, wherein the placement is determined by the volume of input to: the map-phase of the job, the reduce-phase of the job, or the map-phase and the reduce-phase of the job; and
allocating resources based on locality awareness for a reduce-phase job execution by selectively placing data blocks and virtual machines (VMs) for locality aware reduce-phase job execution, wherein the placement is determined by the volume of input to: the map-phase of the job, the reduce-phase of the job, or the map-phase and the reduce-phase of the job.

10. The method of claim 9, wherein:
said selectively placing comprises integrally placing the data and the VMs at selected nodes to lower data transfer network hops for a map-phase and a shuffle-phase of the map-reduce job upon execution by the VMs, compared to placing the data blocks and VMs independently of each other.

11. A computer program product for computing resource allocation for map-reduce job execution, the computer program product comprising a non-transitory tangible storage medium readable by a computer system and storing instructions for execution by the computer system for performing a method comprising:
determining the volume of input data to the map-phase and the reduce-phase of a map-reduce job prior to execution;
based on said determination, selectively placing data blocks and virtual machines (VMs) for locality aware map-reduce job execution on a cluster of computing nodes in a network, wherein the network comprises a network tree topology;
wherein selectively placing data blocks and VMs comprises:
integrally placing the data and the VMs at selected nodes to lower data transfer network hops for a map-phase and a shuffle-phase of the map-reduce job upon execution by the VMs; and
selectively placing data blocks and VMs by processing the network tree topology to find shortest subtrees that have a particular number of nodes.

12. The computer program product of claim 11, wherein:
said selectively placing comprises integrally placing the data and the VMs at selected nodes to lower data transfer network hops for a map-phase and a shuffle-phase of the map-reduce job upon execution by the VMs, compared to placing the data blocks and VMs independently of each other.

13. The computer program product of claim 12, wherein:
the nodes form a k-club of least possible k, wherein a k-club of a graph G is defined as a maximal subgraph of G of diameter k.

14. The computer program product of claim 13, wherein selectively placing data blocks and VMs by processing the network tree topology to find shortest subtrees that have a particular number of nodes comprises processing the network tree topology bottom-up to find shortest subtrees that have at least n nodes, wherein n is the number of VMs desired for the job and for subtrees of the same height, and selecting the tree with the most available expected computing resources.

15. The computer program product of claim 14, wherein:
the shortest subtrees form a k-club, where k/2 is the height of the subtree.

16. The computer program product of claim 12, wherein lowering data transfer network hops results in at least 50% reduction in job execution time, compared to the case of placing the data blocks and virtual machines independently of each other.

17. The computer program product of claim 11, wherein said placing data blocks and virtual machines comprises integrated placement of data blocks and VMs for locality aware map-reduce job execution.

18. A system for computing resource allocation for map-reduce job execution, comprising:
a processor; and
a resource allocation module that uses the processor to selectively place data blocks and virtual machines (VMs) for locality aware map-reduce job execution on a cluster of computing nodes in a network, utilizing job-specific placement of data blocks and VMs for locality awareness, wherein the placement is determined by the volume of input to the map-phase and reduce-phase of the job, wherein the network comprises a network tree topology and selectively placing data blocks and VMs comprises selectively placing data blocks and VMs by processing the network tree topology to find shortest subtrees that have a particular number of nodes.

19. The system of claim 18, comprising:
a map-phase locality aware resource allocator that selectively places data blocks and virtual machines (VMs) for locality aware map-phase job execution, wherein the placement is determined by the volume of input to: the map-phase of the job, the reduce-phase of the job, or the map-phase and the reduce-phase of the job; and
a reduce-phase locality aware resource allocator that selectively places data blocks and virtual machines (VMs) for locality aware reduce-phase job execution, wherein the placement is determined by the volume of input to: the map-phase of the job, the reduce-phase of the job, or the map-phase and the reduce-phase of the job.

20. The system of claim 18, wherein the resource allocation module selectively places data blocks and VMs at selected nodes to lower data transfer network hops for a map-phase and a shuffle-phase of the map-reduce job upon execution by the VMs, compared to placing the data blocks and VMs independently of each other.

* * * * *